(12) United States Patent
Chu et al.

(10) Patent No.: US 6,695,081 B2
(45) Date of Patent: Feb. 24, 2004

(54) BUILD-UP LIGHT MOTOR DRIVEN CAR

(76) Inventors: Simon Chu, 111 Railroad Ave., Glenside, PA (US) 19038; Chih-Chin Hsieh, 7F, No. 16-5, Jian Kang Road, Taipei (TW); Tseng-Chien Lin, No. 169, Nan-Ya Street, Hsinchu (TW)

( * ) Notice: Subject to any disclaimer, the term of this patent is extended or adjusted under 35 U.S.C. 154(b) by 0 days.

(21) Appl. No.: 10/205,440

(22) Filed: Jul. 26, 2002

(65) Prior Publication Data

US 2003/0192726 A1 Oct. 16, 2003

(30) Foreign Application Priority Data

Apr. 11, 2002 (TW) .................................... 91204726 U

(51) Int. Cl.⁷ ................................................ B60K 1/00
(52) U.S. Cl. .................. 180/65.1; 180/907; 297/440.22
(58) Field of Search .......................... 280/250.1, 304.1, 280/DIG. 5; 180/65.1, 907, 908, 65.5; 297/DIG. 4, 440.1, 440.22

(56) References Cited

U.S. PATENT DOCUMENTS

| | | | |
|---|---|---|---|
| 3,749,192 A | * | 7/1973 | Karchak et al. ............. 180/6.5 |
| 4,030,774 A | * | 6/1977 | Foster ........................ 280/261 |
| 4,967,864 A | * | 11/1990 | Boyer et al. ................ 180/65.1 |
| 5,020,624 A | * | 6/1991 | Nesterick et al. ........... 180/210 |
| 5,036,938 A | * | 8/1991 | Blount et al. ............... 180/208 |
| 5,042,607 A | * | 8/1991 | Falkenson et al. .......... 180/208 |
| 5,145,020 A | * | 9/1992 | Quintile et al. ............ 180/65.1 |
| 5,238,082 A | * | 8/1993 | Stegeman et al. .......... 180/208 |
| 6,073,951 A | * | 6/2000 | Jindra et al. ............. 280/304.1 |
| 6,129,165 A | * | 10/2000 | Schaffner et al. .......... 180/65.1 |
| 6,170,592 B1 | * | 1/2001 | Wu ............................. 180/208 |
| 6,357,817 B1 | * | 3/2002 | Wu ............................. 296/177 |
| 6,439,331 B1 | * | 8/2002 | Fan ............................. 180/208 |
| 6,488,339 B1 | * | 12/2002 | Finner et al. .......... 297/440.16 |

* cited by examiner

*Primary Examiner*—Brian L. Johnson
*Assistant Examiner*—Brian Swenson
(74) *Attorney, Agent, or Firm*—Troxell Law Office PLLC

(57) ABSTRACT

A build-up light motor driven car includes a car body, which is composed of a car frame and an outer shell enclosing the car frame, and a seat part. The car body is provided with a guide groove at two lateral sides thereof respectively, the guide groove having an engaging part, the outer shell having a shell chamber behind the respective guide groove. The seat part has two seat frames corresponding to the two guide grooves, the seat frames at upper parts thereof being attached with a seat cushion and at lower parts thereof connecting with a horizontal level respectively for locating a battery and the respective horizontal level at an end thereof having an engaging part. The horizontal levels is inserted into the guide grooves such that the engaging parts can be inserted into the joining parts so as to fixed to each other, and the batteries can enter the shell chambers to constitute connection of a circuit such that seat part can be joined to or detached from the car fast.

18 Claims, 6 Drawing Sheets

BUILD-UP LIGHT MOTOR DRIVEN CAR

BACKGROUND OF THE INVENTION

1. Field of the Invention

The present invention relates to a build-up light motor driven car and, in particular, to a light motor driven car, in which the car body and the seat part can be joined to and detached from each other for being ridden, moved and delivered easily.

2. Description of Related Art

The development of motor driven car gives the handicaps or the old aged persons a lot of convenience in moving. In order to be controlled with facility, the motor driven car can be classified into three-wheel type and four-wheel type. That is, the front wheel of the car body is controlled for the direction of the moving car and the rear wheels being responsible for moving forward. The two rear wheels provide an effect of differential, i.e., the rear wheel at the inner side of the car body having a rotational speed lower than that of the outer side of the car body, so that the dangerous phenomenon of turning over or being unable to turn can be avoided. Hence, in order to carry out the effect of differential between the driving wheel and the driven wheel, the transmission mechanism of the car has to be mounted with a sophisticated speed reducer additionally such that the span between the rear wheels has to be increased and the size and the weight of the car has to be increased in addition to the complication of the car.

Besides, the motor driven car is equipped with a car body, a transmission mechanism, batteries, a seat part and a control device so that the gross weight thereof is considerably heavy. Hence, it is exhausted for a normal adult to move the conventional motor let alone the handicaps or the old aged persons. Further, the conventional motor driven car has all the parts thereof being fixed to the car body such that a height thereof is considerable and it is not possible for the motor driven car to be placed in the trunk of a car while the rider needs to carry the motor driven car with him for far away traveling or shopping. In order to overcome the problem of delivering the motor driven car, a way of the prior art has been done with separating the car into a front control part and a rear seat parts. But, it is very sophisticated for the connection of the two parts though the purpose of weight of the motor driven car being divided an be reached. Moreover, the transmission mechanism and the batteries under the seat part are very heavy and the all over weight thereof is hard for a normal person to carry about.

SUMMARY OF THE INVENTION

Accordingly, an object of the present invention is to provide a build-up light motor driven car including a car body, which is composed of a car frame and an outer shell enclosing the car frame, and a seat part. The car body is provided with a guide groove at two lateral sides thereof respectively, the guide groove having an engaging part, the outer shell having a shell chamber behind the respective guide groove. The seat part has two seat frames corresponding to the two guide grooves, the seat frames at upper parts thereof being attached with a seat cushion and at lower parts thereof connecting with a horizontal level respectively for locating a battery and the respective horizontal level at an end thereof having an engaging part. The horizontal levels is inserted into the guide grooves such that the engaging parts can be inserted into the joining parts so as to fixed to each other, and the batteries can enter the shell chambers to constitute connection of a circuit such that seat part can be joined to or detached from the car fast.

Another object of the present invention is to provide a build-up light motor driven car associated with the advantages of Taiwanese Utility Model No. 091202315 for enhancing the convenience of being moved.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
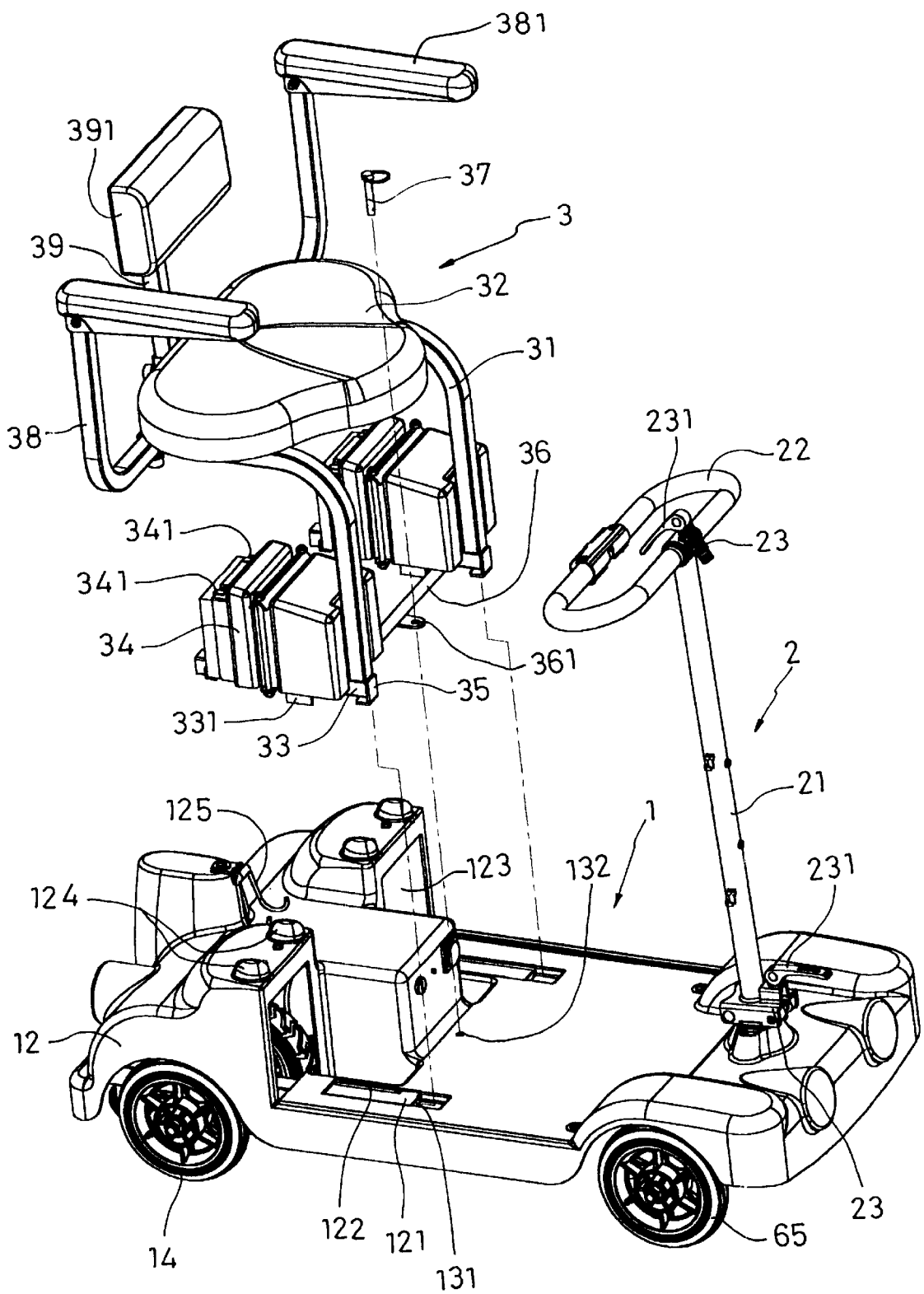
FIG. 1 is a perspective view of a car body and a car seat being detached from each other of a build-up light motor driven car according to the present invention.
Figure 2A:
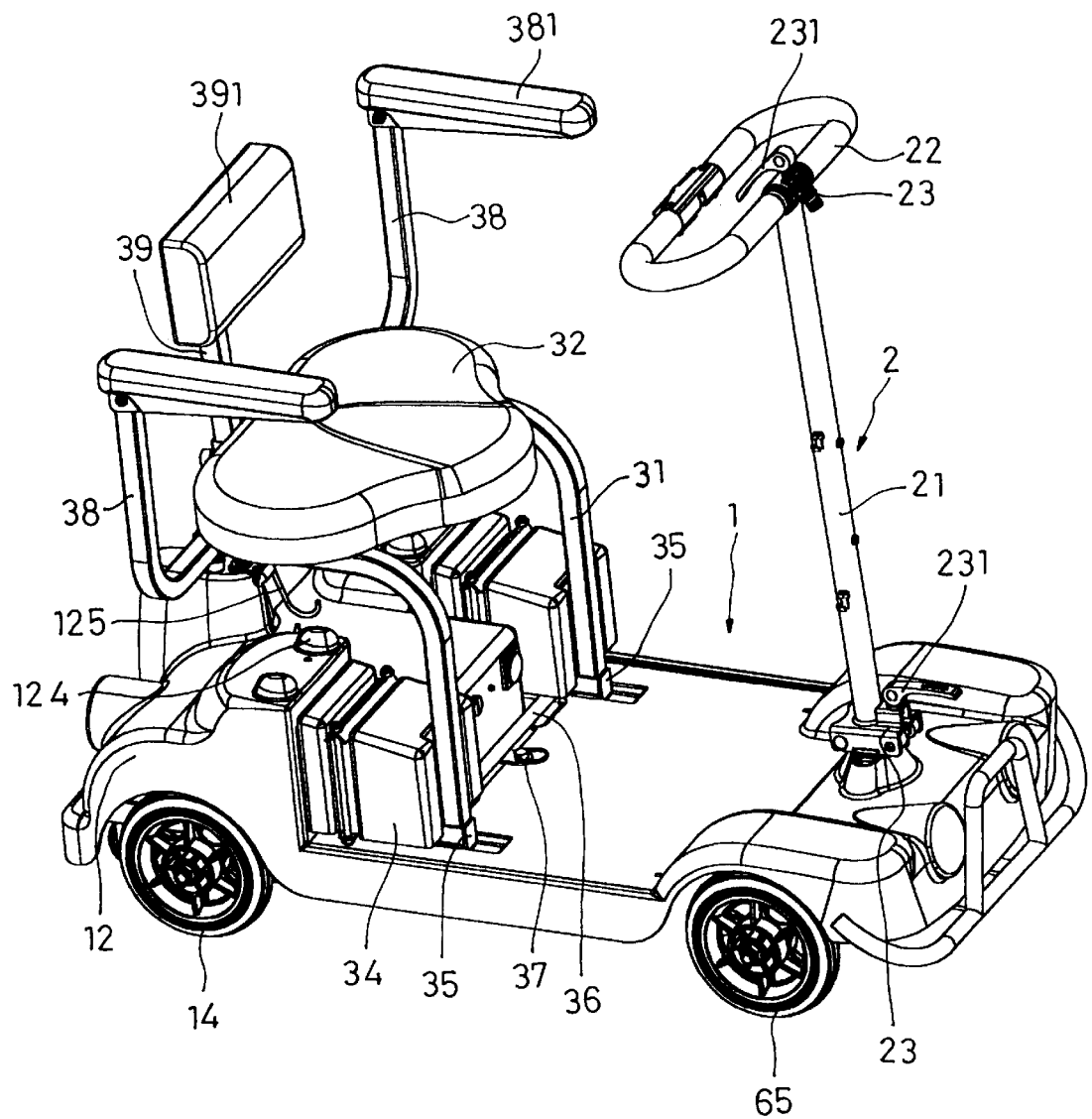
FIG. 2A is an assembled perspective view of the build-up light motor driven car shown in FIG. 1 with a projection angle toward the front side of the car.
Figure 2B:
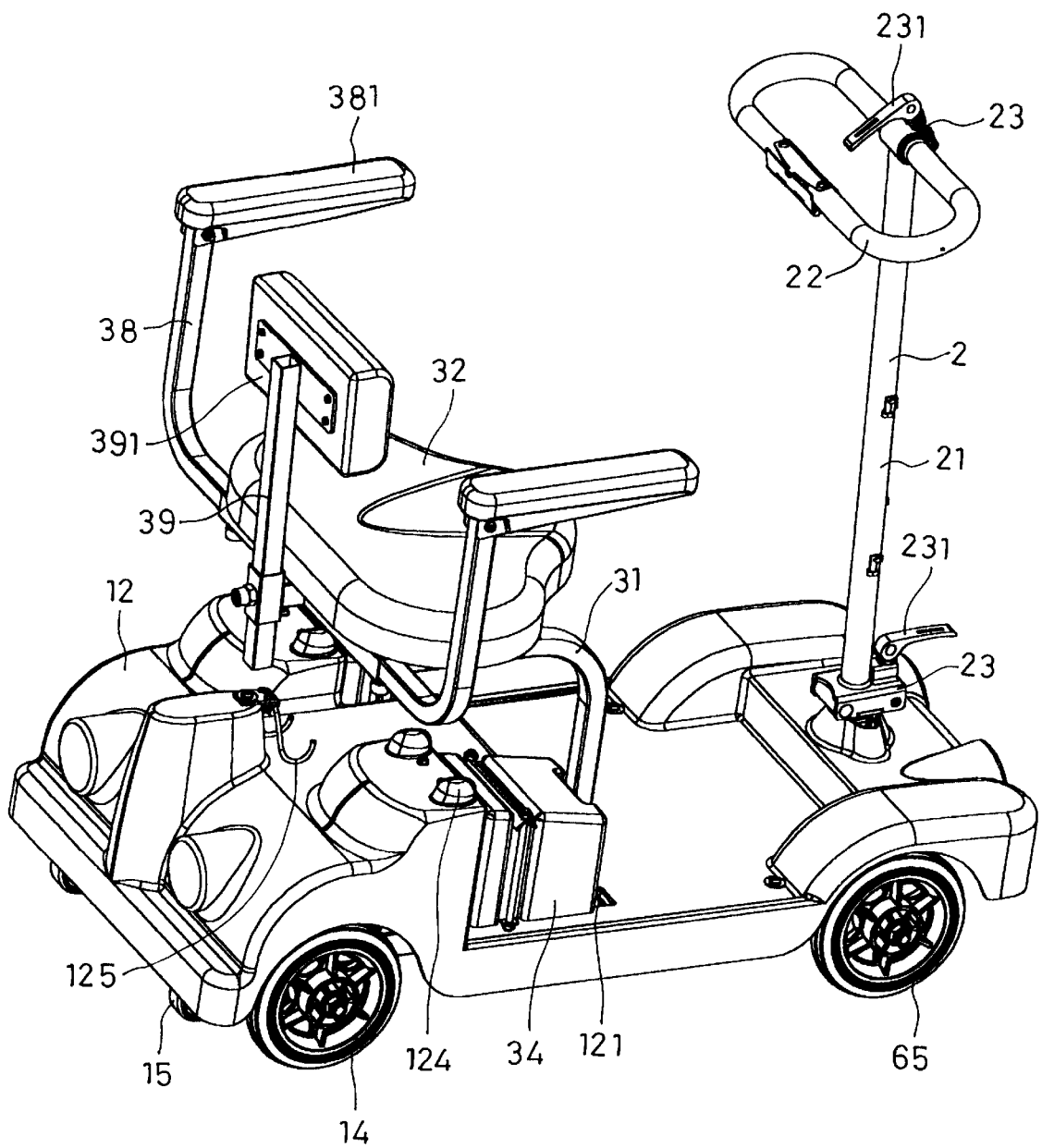
FIG. 2B is an assembled perspective view of the build-up light motor driven car shown in FIG. 1 with a projection angle toward the rear side of the car.
Figure 3:
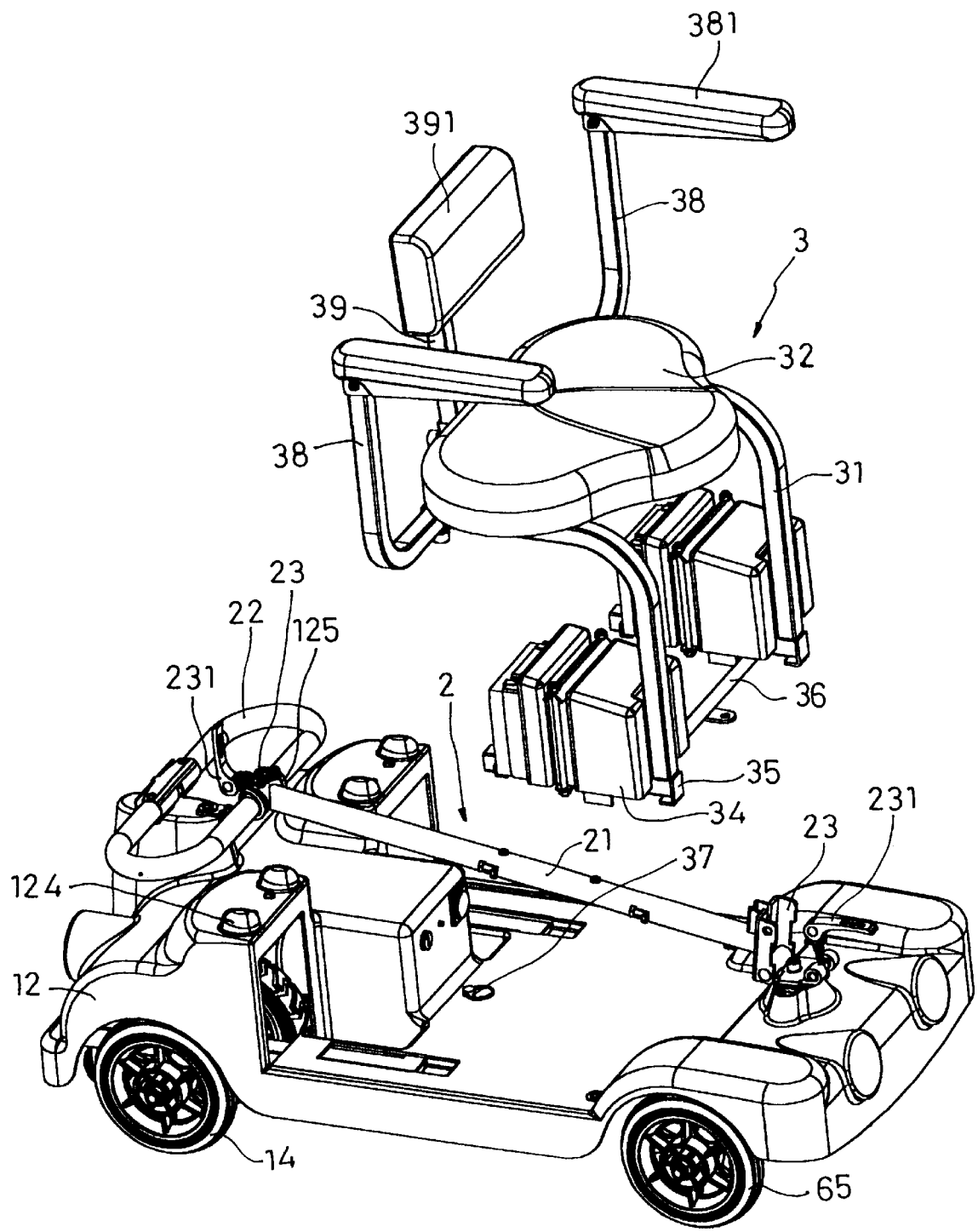
FIG. 3 is a perspective view of the build-up light motor driven car of the present invention being detached as two single units for being capable of delivery.

Referring to FIGS. 1 to 4, a build-up light motor driven car basically comprises a car body 1, a control device 2, a seat part 3, a transmission mechanism 4, a press mechanism 5 and a steering mechanism 6.

Wherein, the car body 1 is a structurally reinforced car frame 11 and an outer shell 12 with a desired profile for covering the car frame 11 so that the transmission mechanism 4, the press mechanism 5 and the steering mechanism 6 are enclosed in the outer shell 12. The control device 2 is disposed at the front side of the car frame 11 and the steering mechanism 6, which is disposed below the control device 2, can be actuated to move relative to the control device 2 such that two front wheels 65 can turn to a direction simultaneously. A support frame 13 is disposed at the rear side of the car frame 11 for receiving and locating both the transmission mechanism 4 and the press mechanism so as to join the seat part 3. The front side of the support frame 13 at both lateral sides thereof is provided with a joining part 131 such as an engaging hole respectively. A pin hole 132 is located at the front side of the frame 13 between the two joining parts 131 and the two lateral sides of the frame 13 at the rear sides thereof are provided with an up extending stopper piece 133 respectively. The stopper pieces 133 can limit the battery moving backward during the battery being mounted to the frame 13. Further, the rear section of the frame 13 at two lateral sides thereof is attached with a driven wheel 14 respectively.

The control device 2 is axially connected to the front side of the car body 1 with the lower end of an elongated shaft 21 thereof connecting with the steering device 6 and the upper end of the elongated shaft 21 being attached with a handle 22. As soon as the handle 22 is operated under control, the steering device 6 below the elongated shaft 21 can turn to a direction and the two front wheels 65 can be actuated to turn the same direction synchronously so as to allow the car frame 1 moving forward or make a turn. The elongated shaft 21 at the upper and the lower ends thereof has a clip 23 respectively with a lock stem 231 being controlled to loosen/tighten the clip 23 such that the elongated shaft 21 or the handle 22 can lean laterally so as to take in the shaft 21 or allow the handle rotating to and staying at a proper angle for accommodating individual rider's body size and obtaining comfortable hand grip.

Figure 4A:
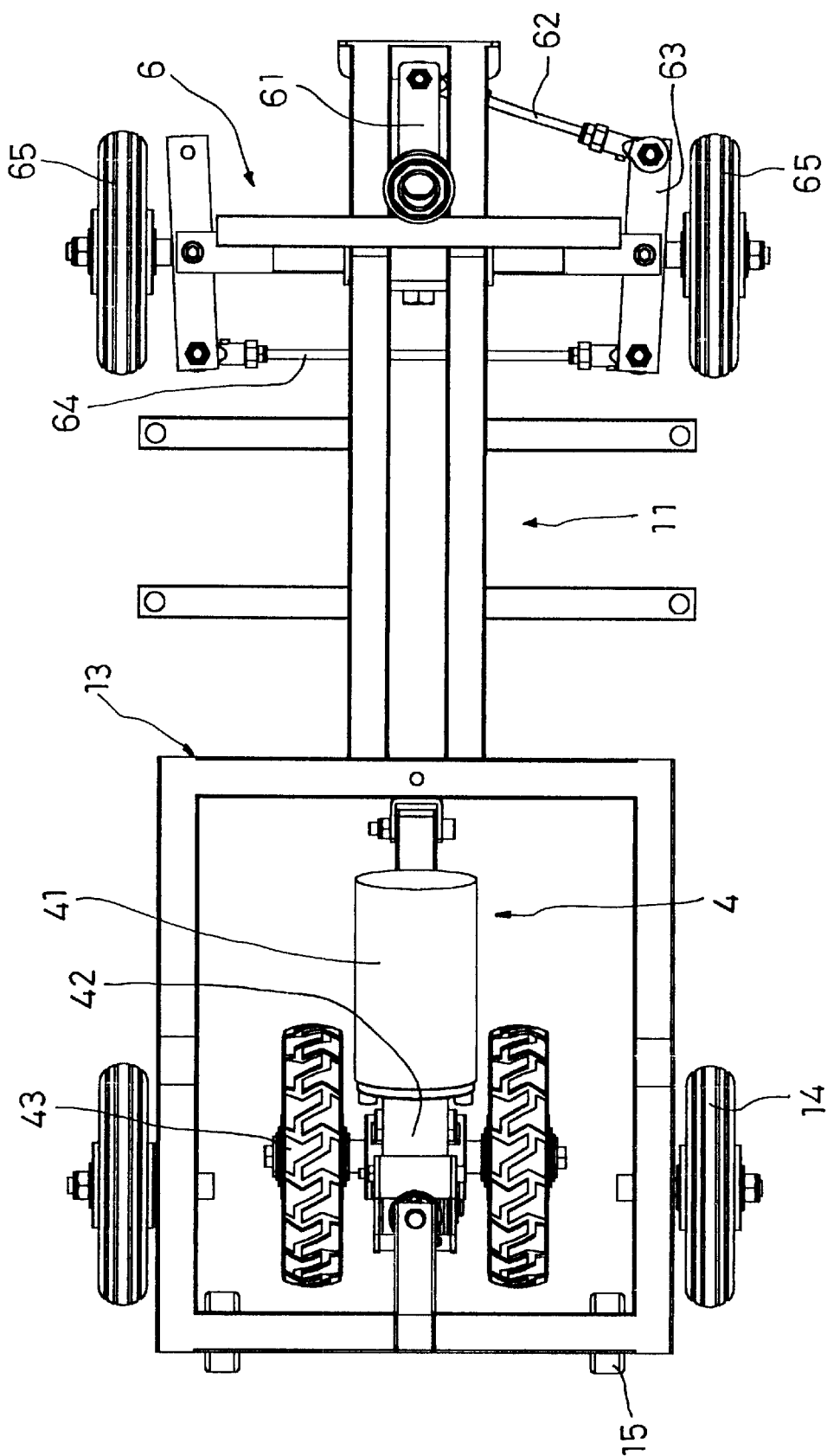
FIG. 4A is a top view of a transmission mechanism and a steering mechanism in the build-up motor driven car according to the present invention.
Figure 4B:
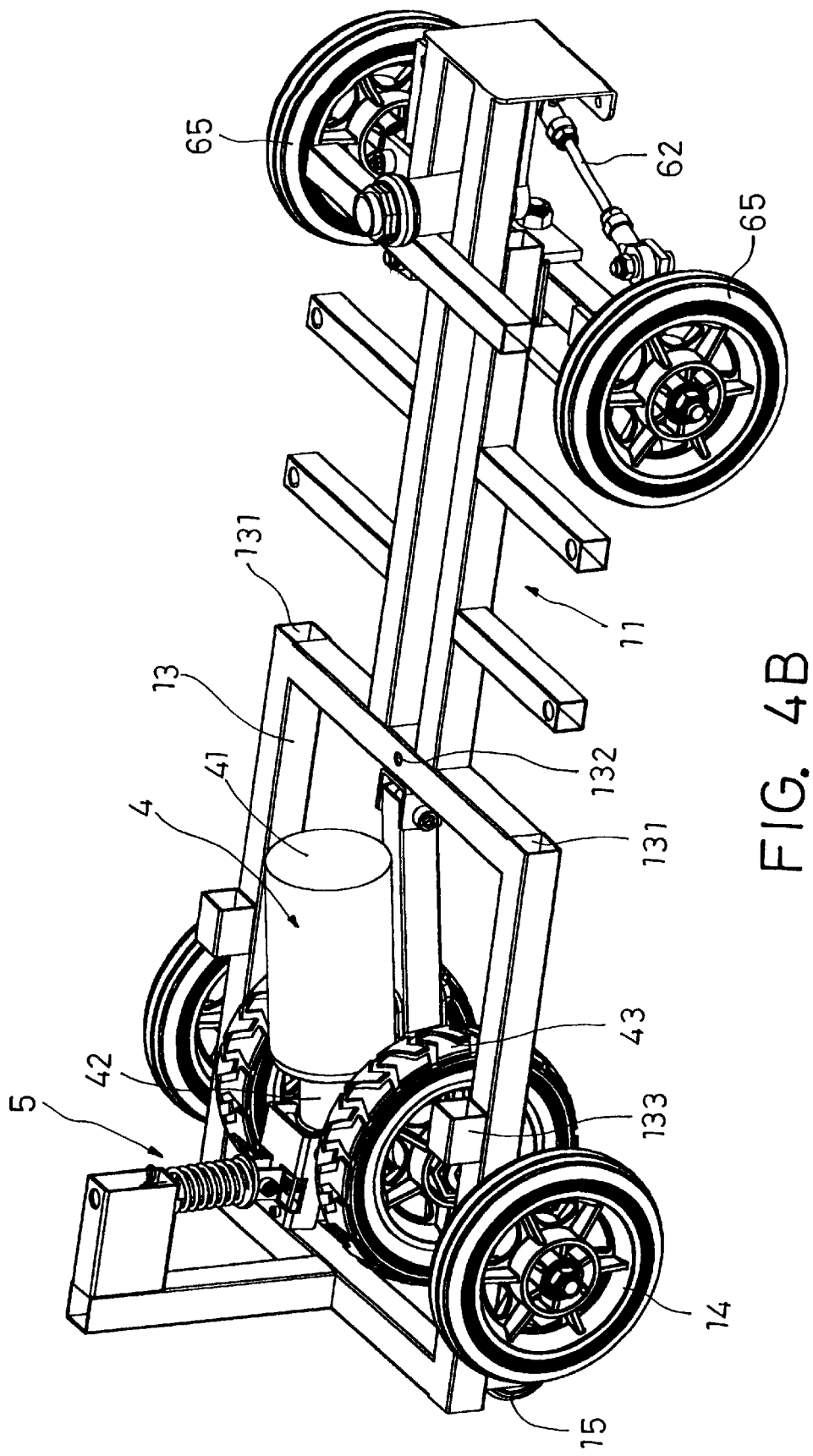
FIG. 4B is a perspective view of a transmission mechanism and a steering mechanism in the build-up light motor driven car according to the present invention.

Referring to FIGS. 4A and 4B, the steering device 6 has a stir plate 61 with an end thereof being joined to the lower end of the shaft 21 and the other end thereof being connected to an end of a connection rod 62. Further, another end of the connecting rod 62 connects with an end of one of two connecting plates 63 pivotally fixed at two lateral sides of the car frame 11. Each of the connecting plates 63 at a lateral outer side thereof pivotally connects with a front wheel 65 respectively and a follower rod at both ends thereof connects with the other end of each of the two connecting plates 63 such that a linkage can be formed and the connecting plates 63 and the follower rod 64 can move relative to each other. Hence, the shaft 21 and the stir plate 61 at the lower end of the shaft 21 rotate synchronously to actuate the connecting rod 62 moving linearly. In this way, one of the connecting plates 63 can be swung and the other connecting plate 63 also can be swung via the follower rod 64 so that the two front wheels 65 can be turned to a direction simultaneously.

The seat part 3 has two support frames 31 with a seat cushion 32 being arranged on the support frames 31 and each of the support frames 31 at the lower end thereof has a horizontal lever 33 respectively for the battery 34 being spanned on the horizontal levers 33 and being fixed in place with conventional fasteners. In order to be joined to the car body 1, each horizontal lever 33 of the seat part 3 at the joint end thereof has an engaging part 35 such as a lock piece. The outer shell 12 of the car body 1 is provided with an elongated step guide groove 121 respectively corresponding to the joining parts 131 for being inset with the horizontal lever 33 such that the engaging part 35 can be inserted into the joint part 131 sharply to constitute a state of locating. Meanwhile, the battery 34 supported with the two horizontal levers 33 enters the car body 1 via a preset shell chamber 123 at the back of guide groove 121 till the end part of the battery 34 touches the stoppers 133 such that two electrical poles 341 on the battery 34 can elastically contact with connecting poles in a connecting pole room 124 at the top of the shell chamber 123 for supply required power. Besides, in order to enhance the firmness between the seat part 3 and the car body 1, a holding plate 36 between the horizontal levers 33 has a positioning hole 361 for being pierced with a pin 37 and the pin 37 can be inserted into the pinhole 132 to perform a function of locating. Further, in order to slide in the guide grooves 121, the horizontal levers 33 at least provides a guide projection 331 respectively and the guide groove 121 provides a corresponding fitting recess 122 for being inserted with the guide projection 331 such that the guide projection 331 can slide along the fitting recess 122.

In addition, in order to increase comfort and safety during being sat, the two support frames 31 at the rear ends thereof extend upward an extension frame 38 respectively with an end of the extension frame 38 being attached with a foldable armrest 381. Besides, a lifted back rod 39 is located at rear part of the car body in back of the extension frame 38 for being leaned against the rider's back.

Referring to FIGS. 1 and 3 again, the outer shell 12 has a hook 125 at the rear side thereof for hooking on the handle 22 while the shaft 21 is bent down to lie on the car body 1 such that the overall height of car body 1 can be reduced and the bent shaft 21 can act as a force exertion point during being moved for the car body 1 being raised easily. The two batteries 34 are disposed under the seat part 3 and the weight of the entire light car is distributed to the car body 1 and the seat part 3 evenly so that awkward situation of being unable to move the car body resulting from overloading is not possible to occur.

The transmission mechanism 4 and the press mechanism 5 are the same as those disclosed in Taiwanese Utility Model Application No. 091202315. A brief description for the transmission mechanism 4 and the press mechanism 5 is explained hereinafter. Referring to FIGS. 4A and 4B, the transmission mechanism 4 is fixedly attached in the frame 13 and includes a motor 41 and an output device 42. The output device 42 at a lateral side thereof at least axially connects with a driving wheel 43, and, preferably, two opposite lateral sides thereof axially connect with a driving wheel 43 respectively between the two driven wheels 14. Thus, the driven wheels 14 can run with an equal speed or unequal speed to comply with various situations directly without any differential so that a span between the driven wheels 14 can be shortened greatly so as to reduce volume of the car body. The press mechanism 5 is provided with a function like a shock absorber for the driving wheel 43 accommodating rugged and coarse ground and no detail will be described further.

Furthermore, at least a small sized support wheel 15 is attached to the frame 13 at the rear side thereof to contact with a slope while the light electric car of the present invention is uphill. Hence, an accident resulting from the car turning up side down due to the entire weight of the car being at the back of the car body can be avoided.

It is appreciated from the preceding description that both the car body and the seat part in the build-up light electric car of the present invention can be joined to and detached from each other and the overall weight thereof is distributed evenly so that it can delivered conveniently in spite of the batteries and the transmission mechanism being mounted to the car body and the disadvantage with regard to the car being too heavy to be moved can be avoided. Further, the control device of the light electric car according to the present invention can be bent down to reduce the volume of the car body greatly for being possible to being taken in the trunk in an ordinary and being delivered far away such that the rider can drive the light electric car of the present invention at any time and any place if desired.

While the invention has been described with reference to the a preferred embodiment thereof, it is to be understood that modifications or variations may be easily made without departing from the spirit of this invention, which is defined by the appended claims.

What is claimed is:

1. A build-up light motor driven car, comprising:
   a car body being composed of a car frame and an outer shell, being provided with a guide groove at two lateral sides thereof respectively, the guide groove having an engaging part, the outer shell having a shell chamber behind the respective guide groove;
   a seat part having two seat frames corresponding to the two guide grooves, the seat frames at upper parts thereof being attached with a seat cushion and at lower parts thereof connecting with horizontal levers respectively and the respective horizontal levers at an end thereof having an engaging part;

two batteries are received in the shell chamber with two electrical poles thereof contacting with two elastic connecting poles in a connecting pole room above the shell chamber and two stopper pieces are located at the car frame to limit the batteries moving inward;

whereby the horizontal levers are inserted into the guide grooves such that the engaging parts are inserted into the joining parts so as to fix to each other, and the two batteries enter the shell chambers to constitute connection of a circuit such that the seat part is joined to or detached from the car.

2. The build-up light motor driven car as defined in claim 1, wherein the engaging part is a lock piece and the joining parts are two engaging grooves at two lateral sides of an end of the car frame.

3. The build-up light motor driven car as defined in claim 1, wherein a pinhole is arranged between the two joining parts and a holding plate with a positioning hole is disposed between the two horizontal levers for a pin passing through the positioning hole and fixing at the pinhole.

4. The build-up light motor driven car as defined in claim 1, wherein the seat frames are connected to an extension frame having foldable armrests on opposite sides thereof and a lifted back rod position behind the seat cushion.

5. The build-up light motor driven car as defined in claim 1, wherein a transmission mechanism with an end thereof is provided to axially connect with the frame and another end thereof connecting with a press mechanism and the transmission mechanism is composed of a motor and an output device with the output device at least connecting with a driving wheel and a rear end of the frame at two lateral sides thereof pivotally connecting with a driven wheel respectively.

6. The build-up light motor driven car as defined in claim 1, wherein at least a support wheel is provided at a rear end of the car frame.

7. The build-up light motor driven car as defined in claim 1, wherein a control device is disposed at a front side of the car body with an elongated shaft at an upper end thereof pivotally connecting with a handle and at a lower end thereof connecting with a steering device for controlling moving directions of front wheels of the car and the lower end of the shaft has a fastening piece to be adjusted loosely or tightly for the shaft being capable of being bent downward and lying on the car body in a way of the handle being hooked up with a hook arranged on the car body.

8. The build-up light motor driven car as defined in claim 7, wherein a further fastening piece is provided between the upper end of the shaft and the handle for controlling a rotational displacement of the handle and locating the handle.

9. The build-up light motor driven car as defined in claim 7, wherein the steering device has a stir plate to connect with the elongated shaft with each of the front wheels pivotally connects with a joining plate respectively and the joining plates at a respective end thereof connect with a follower rod with another end of one of the joining plates connecting with the stir plate so as to turn the front wheels simultaneously.

10. A build-up light motor driven car, comprising:
a car body being composed of a car frame and an outer shell, being provided with a guide groove at two lateral sides thereof respectively, the guide groove having an engaging part, the outer shell having a shell chamber behind the respective guide groove;
a seat part having two seat frames corresponding to the two guide grooves, the seat frames at upper parts thereof being attached with a seat cushion and at lower parts thereof connecting with horizontal levers respectively and the respective horizontal levers at an end thereof having an engaging part;

the horizontal levers at a respective lever side thereof extend at least a guide projection and the guide grooves have a corresponding fitting recess respectively for being slidably inserted with the guide projections;

whereby the horizontal levers are inserted into the guide grooves such that the engaging parts are inserted into the joining parts so as to fix to each other, and the two batteries enter the shell chambers to constitute connection of a circuit such that the seat part is joined to or detached from the car.

11. The build-up light motor driven car as defined in claim 10, wherein the engaging part is a lock piece and the joining parts are two engaging grooves at two lateral sides of an end of the car frame.

12. The build-up light motor driven car as defined in claim 10, wherein a pinhole is arranged between the two joining parts and a holding plate with a positioning hole is disposed between the two horizontal levers for a pin passing through the positioning hole and fixing at the pinhole.

13. The build-up light motor driven car as defined in claim 10, wherein the seat frames are connected to an extension frame having foldable armrests on opposite sides thereof and a lifted back rod position behind the seat cushion.

14. The build-up light motor driven car as defined in claim 10, wherein a transmission mechanism with an end thereof is provided to axially connect with the frame and another end thereof connecting with a press mechanism and the transmission mechanism is composed of a motor and an output device with the output device at least connecting with a driving wheel and a rear end of the frame at two lateral sides thereof pivotally connecting with a driven wheel respectively.

15. The build-up light motor driven car as defined in claim 10, wherein at least a support wheel is provided at a rear end of the car frame.

16. The build-up light motor driven car as defined in claim 10, wherein a control device is disposed at a front side of the car body with an elongated shaft at an upper end thereof pivotally connecting with a handle and at a lower end thereof connecting with a steering device for controlling moving directions of front wheels of the car and the lower end of the shaft has a fastening piece to be adjusted loosely or tightly for the shaft being capable of being bent downward and lying on the car body in a way of the handle being hooked up with a hook arranged on the car body.

17. The build-up light motor driven car as defined in claim 16, wherein a further fastening piece is provided between the upper end of the shaft and the handle for controlling a rotational displacement of the handle and locating the handle.

18. The build-up light motor driven car as defined in claim 16, wherein the steering device has a stir plate to connect with the elongated shaft with each of the front wheels pivotally connects with a joining plate respectively and the joining plates at a respective end thereof connect with a follower rod with another end of one of the joining plates connecting with the stir plate so as to turn the front wheels simultaneously.

* * * * *